United States Patent Office
3,101,202
Patented Aug. 20, 1963

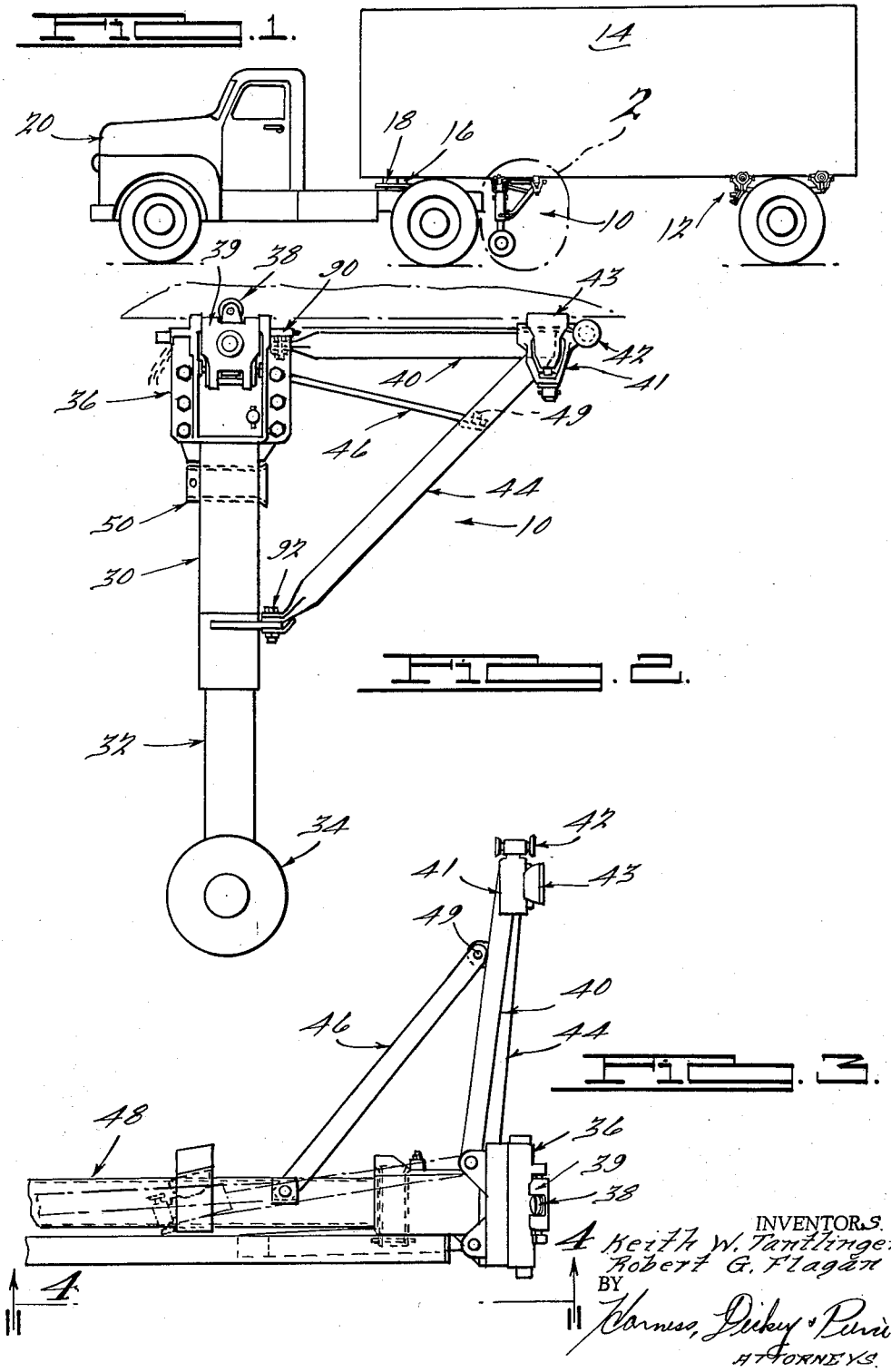

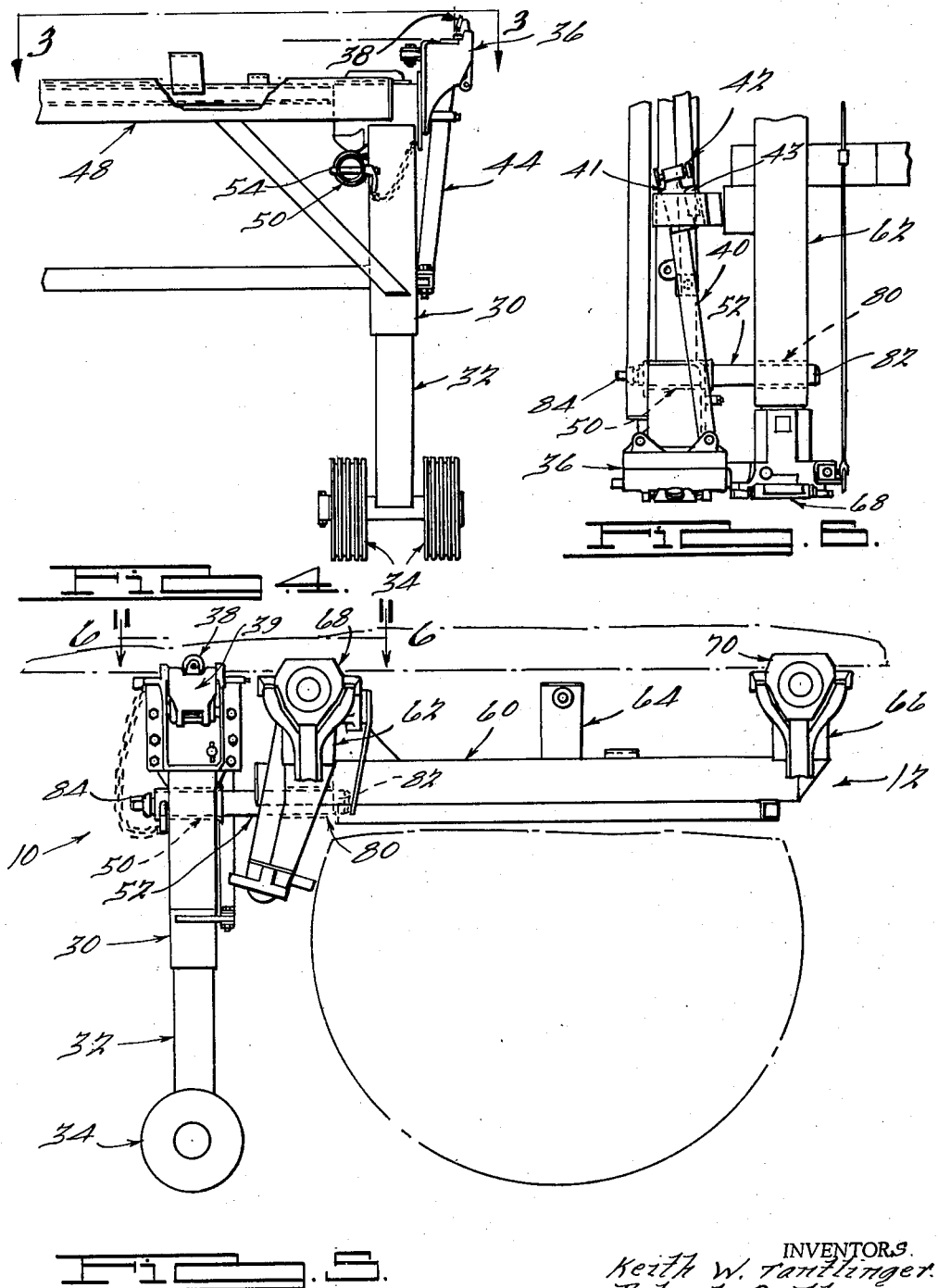

3,101,202
TRAILER WHEEL SUSPENSION AND LANDING
GEAR REMOVABLE AS A UNIT
Keith W. Tantlinger, Grosse Pointe Shores, and Robert G.
Flagan, Grosse Pointe Park, Mich., assignors to Fruehauf Trailer Company, Detroit, Mich., a corporation of Michigan
Filed Nov. 27, 1961, Ser. No. 154,986
5 Claims. (Cl. 280—30)

This invention relates generally to wheeled vehicles and more particularly to a vehicle suspension system.

The advent of the modular shipping container having means for removably accepting a wheel suspension and landing gear to facilitate highway travel, has emphasized the need for an improved and integrated wheel suspension and landing gear that can be coupled, when disassembled, to form a rollable unit. Such an integrated wheel suspension and landing gear should provide for nesting of the landing gear between a pair of wheel suspensions so that the wheel suspensions normally used to condition a pair of single containers for highway travel can be moved into juxtaposed relationship with one another under one of a pair of coupled shipping containers to condition the containers for shipment in the coupled condition and the wheel suspensions for use as a tandem suspension.

The suspension system of the present invention has particular utility in combination with a shipping container of the type disclosed in application Serial No. 112,635, filed May 25, 1961 for: Shipping Apparatus and assigned to the assignee of the instant invention.

A wheel suspension as disclosed in application Serial No. 38,826 filed June 27, 1960 for: Trailer Suspension and assigned to the assignee of the present invention is particularly adapted for use in the suspension system of the instant invention. Further, a landing gear as disclosed in application Serial No. 154,985 filed November 27, 1961 for: Landing Gear and assigned to the assignee of the present invention is particularly suited for use in the suspension system of the instant invention.

A suspension system in accordance with the present invention comprises a landing gear having ground-engaging wheels that are vertically retractable in the conventional manner. The landing gear has a plurality of rolls that are engageable with complementary rails on, for example, a shipping container, to facilitate longitudinal movement of the landing gear with respect to the container. The landing gear is securable to the rails of the container by a novel clamp mechanism that is readily adjusted between the clamped and unclamped condition to facilitate both longitudinal positioning of the landing gear with respect to the container and to condition the landing gear for disengagement from the shipping container.

A suspension system in accordance with the present invention features means for coupling the landing gear to the wheel suspension when the landing gear is moved into juxtaposed relationship therewith. Thus, when coupled, the wheel suspension and landing gear are removable from the shipping container and rollable as a unit.

Accordingly, one object of the present invention is an improved suspension system for conditioning shipping apparatus for highway travel.

Another object is a landing gear that is movable into nested relationship with a wheel suspension.

Another object is a landing gear that can be secured in juxtaposed nested relationship to a wheel suspension.

Another object is a landing gear and wheel suspension that can be positioned longitudinally of a wheel suspension and removed therefrom as a rollable unit.

Other objects and advantages of the present invention will be apparent in the following specification, claims and drawings, wherein:

FIGURE 1 is a side view of a shipping container provided with the suspension system of the instant invention shown in operative association with a conventional tractor.

FIG. 2 is a view taken within the circle 2 of FIGURE 1;

FIG. 3 is a view taken substantially along the line 3—3 of FIG. 2;

FIG. 4 is a view taken substantially along the line 4—4 of FIG. 2;

FIG. 5 is a view similar to FIGURE 1 showing the landing gear in the nested condition with the wheel suspension; and FIG. 6 is a view taken substantially along the line 6—6 of FIG. 5.

Referring to the drawings, a suspension system in accordance with the present invention comprises a landing gear 10 and wheel suspension 12 adapted to be releasably and adjustably engaged with, for example, a shipping container 14. The shipping container 14 is preferably of the type disclosed in the aforementioned application Serial No. 112,635 for: Shipping Apparatus. The shipping container 14 is provided with a kingpin 16 that is accepted in a conventional fifth wheel 18 of a tractor 20 to transmit tractive effort thereof to the container 14.

The landing gear 10 is preferably of the type disclosed in the aforementioned application Serial No. 154,985 for Landing Gear and the wheel suspension 12 is preferably of the type disclosed in application Serial No. 38,826 for: Trailer Suspension.

As discussed in applications Serial No. 154,985 for: Landing Gear and Serial No. 38,826 for: Trailer Suspension, both the landing gear 10 and wheel suspension 12 are movable longitudinally of the container 14 so as to be completely removable therefrom. Obviously, however, when the landing gear 10 and wheel suspension 12 are removed from the container 14, they are relatively unwieldy as they tend to rotate about the ground-engaging wheels thereof.

In accordance with the present invention, the landing gear 10 can be coupled to the wheel suspension 12 to form a stable, rollable unit. The landing gear 10 can be coupled to the wheel suspension 12 prior to removal thereof from the container 14 so that, upon disassociation from the container 14, the landing gear 10 and wheel suspension 12 form a self-stabilizing unit that can be rolled to any desired position. Conversely, the landing gear and wheel suspension 12 can be rolled into position as a unit under a container 14, coupled thereto, and then separated to function independently as a means for supporting opposite ends of the container 14 for highway travel in the conventional manner.

As best seen in FIG. 2 of the drawings, the landing gear 10 comprises a tubular housing 30 for the support of an extensible member 32 that is vertically movable relative to the housing 30 as by a conventional rack and gear (not shown). Ground-engaging wheels 34 are supported by the member 32. A roll support housing 36 is secured to an upper end of the housing 30 for the support of a container-engaging roll 38, as is more particularly disclosed in application Serial No. 154,985 for: Landing Gear. The roll support housing also supports a clamp 39 that is releasably engageable with the container 14 to preclude relative movement between the landing gear 10 and container 14.

A horizontal strut member 40 extends rearwardly of the roll support housing 36 for the support of a housing 41 for a container-engaging rear roll and clamp 43. The housing 41 is also supported by an upwardly and rearwardly extending strut member 44. A brace 46 extends rearwardly from a transverse frame member 48 (FIG. 3) and is releasably secured to the strut as by a pin 49 on the strut 44. As best seen in FIG. 6, the struts 40 and 44, housing 41, roll 42, clamp 43 and brace 46 are foldable to a laterally inwardly extending position thereby to condition the landing gear 10 for movement into a nested and coupled relation with the wheel suspension 12.

As best seen in FIG. 2, the downwardly depending housing 30 has a generally horizontally extending tubular member 50 secured thereto, as by welding, for the acceptance of a pin 52 (FIG. 5) that is adapted to couple the landing gear 10 to the wheel suspension 12. The pin 52 is lockable in the housing 50 as by a locking pin 54 (FIG. 4).

As best seen in FIG. 5 of the drawings, the wheel suspension 12 comprises a horizontal frame member 60 and a plurality of cross bolsters 62, 64 and 66. The bolsters 62 and 66 are provided with clamps 68 and 70, respectively, for engagement with a lower edge portion of the container 14 as is more particularly described in application Serial No. 38,826 for: Trailer Suspension.

A tubular member 80 is secured to the underside of the cross bolster 62, as by welding, for the acceptance of a rear end portion 82 of the pin 52. The pin 52 is secured within the tubular member 80 by any suitable means, for example, a transverse pin, welding, etc. Thus, when the landing gear 10 is moved rearwardly toward the wheel suspension 12, a forward end 84 of the pin 52 is accepted within the tubular member 50 secured to the housing 30 of the landing gear 10. Upon movement of the landing gear 10 into close juxtaposed and nested relation with respect to the wheel suspension 12, the end portion 84 of the pin 52 extends sufficiently far into the tubular member 50 for the locking pin 54 to be inserted therethrough, thus positively coupling the landing gear 10 to the wheel suspension 12.

To condition the landing gear 10 and wheel suspension 12 for removal from the container 14 as a rollable unit, the wheels 34 of the landing gear are first retracted upwardly to facilitate rearward movement of the landing gear 10 relative to the wheel suspension 12. The landing gear 10 is then conditioned for rearward movement by disengaging the clamp 39 and clamp 43 so as to engage the rolls 38 and 42 thereof, respectively, as is more particularly described in application Serial No. 154,985 for Landing Gear, whereupon the landing gear 10 is movable rearwardly of the container 14 toward the wheel suspension 12. The brace 46 is then disengaged from the pin 49 on the strut 44 and struts 40 and 44, housing 41, roll 42 and clamp 43 are pivoted laterally inwardly of the container 14 about vertically aligned pins 90 and 92 which secure the struts 40 and 44 to the roll housing 36 and housing 30, respectively. The position of the struts 40 and 44 and roll housing 42 in the laterally inwardly forward condition is best seen in FIG. 6 of the drawings.

Upon folding of the struts 40 and 44, the landing gear 10 is movable into close juxtaposed or nested relation with respect to the wheel suspension 12, whereupon the end portion 84 of the pin 52 extends through the tubular housing 50 on the housing 30 of the landing gear 10 so that the pin 54 is insertable therethrough. The wheel 34 is then cranked downwardly in the conventional manner to the ground-engaging condition, whereupon the container-engaging clamps 68 and 70 are disengaged from the container 14, as is more particularly described in application Serial No. 38,286 for trailer suspension and the now-coupled landing gear 10 and wheel suspension 12 are removable from the container 14.

Conditioning of the container 14 for highway travel is the reverse of the aforementioned disassembly procedure, namely, the landing gear 10 and wheel suspension 12 are rolled under the container 14 as a unit, the wheel suspension 12 is coupled to the container 14, the wheels 34 on the landing gear 10 are retracted, the pin 54 is retracted to permit disengagement of the pin 52 and sleeve 50 and movement of the landing gear 10 away from the wheel suspension 12. The wheel suspension 12 is moved forwardly of the container 14 to a desired position, the struts 40 and 44 rotated to the longitudinally extending condition and the clamps 39 and 43 locked with respect to the container 14. The wheels 34 may then be cranked downwardly to a ground-engaging position or, alternatively, the container 14 may be coupled to a tractor.

It is to be noted that because the landing gear 10 is movable into close juxtaposed relation with the wheel suspension 12, a second wheel suspension (not shown) is movable into close proximate relation with the wheel suspension 12 thereby to function as a tandem suspension for the container 14 at such time as the container 14 may be coupled to a second container (not shown) as is more particularly described in application Serial No. 112,635 for: Shipping apparatus.

The foregoing discussion of the instant invention has been limited to one side of the landing gear 10 and wheel suspension 12. Obviously, however, the opposite sides of the landing gear 10 and wheel suspension 12 are provided with like means for coupling the landing gear 10 and wheel suspension 12 to the container 14 as well as like means for coupling the landing gear 10 to the wheel suspension 12.

It is to be understood that the specific construction of the improved suspension system herein disclosed and described is presented for the purpose of explanation and illustration and is not intended to indicate limits of the invention, the scope of which is defined by the following claims.

What is claimed is:

1. In a shipping apparatus comprising a shipping container, an improved suspension system for conditioning the shipping container for highway travel comprising
   a landing gear
      removably secured to the shipping container,
   a wheel suspension
      removably secured to the shipping container, and
   means
      for removably coupling said landing gear to said wheel suspension for movement as a unit into and away from an engaged condition with the shipping container.

2. In an over-the-road shipping apparatus comprising a shipping container having longitudinally extending rails thereon, a removable suspension system for the shipping container comprising
   a landing gear
      removably secured to the rails of the shipping container for movement longitudinally thereof,
   a wheel suspension
      removably secured to the rails of the shipping container for movement longitudinally thereof, and
   means
      for removably coupling said landing gear to said wheel suspension for movement as a unit into and away from an engaged condition with the shipping container.

3. In an over-the-road shipping apparatus comprising a shipping container having longitudinally extending rails thereon, a removable suspension system for the shipping container comprising
   a landing gear
      removably secured to the rails of the shipping container for movement longitudinally thereof,
   a wheel suspension
      removably secured to the shipping container for movement longitudinally thereof, and
   means
      for removably coupling said landing gear to said wheel suspension while said wheel suspension remains coupled to the rails of the shipping container whereby said landing gear and wheel suspension are movable as a unit away from an engaged condition with the shipping container.

4. In an over-the-road shipping apparatus comprising a shipping container, an improved suspension system for the shipping container comprising
a landing gear
having
a leg
depending downwardly for the support of a ground-engaging wheel,
a strut
pivotally secured to said leg,
a pair of clamps
on said leg and strut, respectively, for removably securing the landing gear to the shipping container at a desired position,
a wheel suspension
removably secured to the shipping container, and
means
extending between and engageable with said landing gear and wheel suspension for coupling said landing gear to said wheel suspension, the strut portion of said landing gear being foldable to a position generally parallel to the axis of the ground-engaging wheels to facilitate positioning of said landing gear and wheel suspension in juxtaposed nested relation.

5. In combination with a shipping container, a suspension system for conditioning the shipping trailer for highway travel comprising
a landing gear
having
a pair of legs
depending downwardly for the support of a pair of ground-engaging wheels,
a pair of struts
pivotally secured to said legs, respectively,
a pair of longitudinally spaced clamps
on each of said legs and struts, respectively, for removably securing the landing gear to the shipping apparatus at a desired longitudinal position,
a wheel suspension
having
a plurality of clamps
for removably securing said suspension to the shipping apparatus, and
a pair of pins
extending between and releasably engageable with said landing gear and wheel suspension for coupling said landing gear to said wheel suspension, the strut portions of said landing gear being foldable to a laterally extending position to facilitate positioning of said landing gear and wheel suspension in juxtaposed nested relation.

References Cited in the file of this patent
UNITED STATES PATENTS

| | | |
|---|---|---|
| 2,369,384 | Zubatsky | Feb. 13, 1945 |
| 2,714,016 | Smith | July 26, 1955 |
| 3,004,772 | Bohlen | Oct. 17, 1961 |